Figure 3:
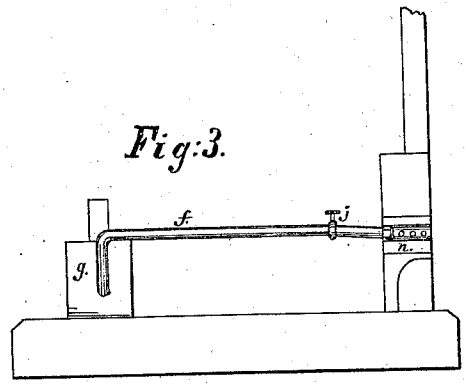

2 Sheets--Sheet 1.
W. ROGERS.
Apparatus for Supplying Gas as a Fuel to Metallurgic Furnaces
No. 164,876.    Patented June 22, 1875.
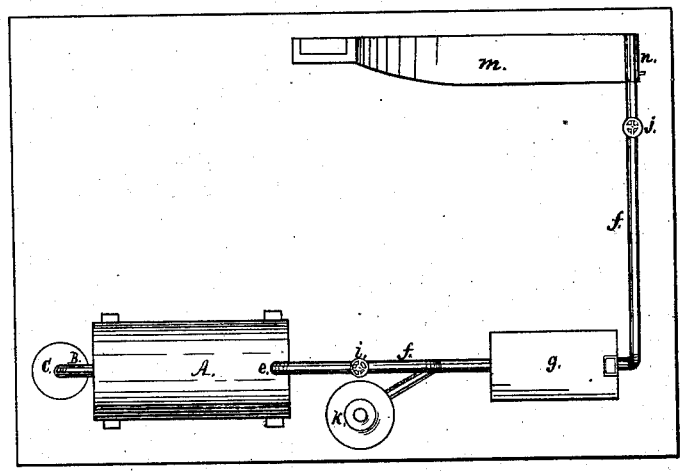
Fig: 1.
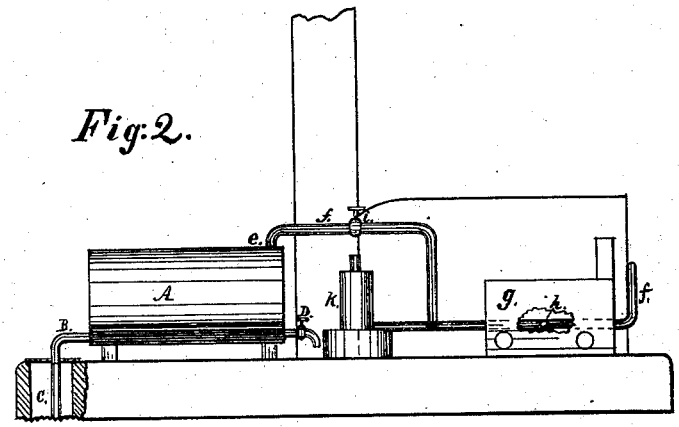
Fig: 2.
Witnesses.
J. G. Thompson.
A. H. Johnston.
Inventor.
William Rogers.
By J. J. Johnston,
his attorney.
THE GRAPHIC CO. PHOTO-LITH. 39 & 41 PARK PLACE, N.Y.

2 Sheets--Sheet 2.

W. ROGERS.
Apparatus for Supplying Gas as a Fuel to Metallurgic Furnaces

No. 164,876. Patented June 22, 1875.

Witnesses.
J. G. Thompson,
A. H. Johnston,

Inventor.
William Rogers.
By S. S. Johnston,
his attorney.

THE GRAPHIC CO. PHOTO-LITH. 39 & 41 PARK PLACE, N.Y.

UNITED STATES PATENT OFFICE.

WILLIAM ROGERS, OF LEECHBURG, ASSIGNOR TO HIMSELF AND THOMAS J. BURCHFIELD, OF ALLEGHENY, PENNSYLVANIA.

IMPROVEMENT IN APPARATUS FOR SUPPLYING GAS AS A FUEL TO METALLURGIC FURNACES.

Specification forming part of Letters Patent No. 164,876, dated June 22, 1875; application filed June 3, 1874.

*To all whom it may concern:*

Be it known that I, WILLIAM ROGERS, of Leechburg, in the county of Armstrong and State of Pennsylvania, have invented a certain new and useful Improvement in Apparatus for Supplying Gas as a Fuel to Furnaces used in the Manufacture of Iron; and I do hereby declare that the following is a full, clear, and exact description thereof, reference being had to the accompanying drawings and to the letters of reference marked thereon.

In the process of manufacturing iron and steel economy of fuel, and improvement in the quality of it, are two things which have enlisted the attention of inventors and manufacturers for more than two hundred years; and for accomplishing these very desirable results a large number of furnaces of different kinds and of various construction have been invented and used, having for their object the complete combustion of the fuel used, and a perfect utilization of the heat generated therefrom.

Inventors and manufacturers have also, for the purpose of economy of fuel, and for increasing its value as a heating medium in the manufacture of iron and steel, resorted to the use of air, both cold and hot, steam, and vapor from hydrocarbon oils, combined with coal, both anthracite and bituminous. Bituminous coal has been converted into gas and coke under different conditions, and by a variety of means; but all these devices and fuels have failed to meet the wants of the manufacturers of iron and steel; and the only improvement which they have accepted as a comparative success in the present state of the art in this country, and also in Europe, is the Siemens furnace, but its cost of construction, expense of keeping it in order, and the cost of the skilled labor required to operate it, combined with the tax or royalty imposed on manufacturers for the right to use said improvement, are serious objections to its adoption, and, among manufacturers of iron and steel, it is a disputed question as to its value in the art of manufacturing iron and steel.

The manufacturers of iron and steel have long desired a fuel for a heating medium which would be at least a near approach to wood-charcoal in point of value, and which could be used in the furnaces now in general use, and so well understood by the workmen in rolling-mills in all parts of the civilized world, to which they have to look for the labor used in the art of manufacturing iron and steel.

To supply this general want among the manufacturers of iron and steel in all its aspects is the object of my invention, which result I accomplish by utilizing the gas generated from coal or hydrocarbon oils in the bowels of the earth, or by the use of gas generated from coal, wood, peat, shale, oil, and such other matter and things as are susceptible of being converted into a gas which will create flame and heat, which gas I convey to the furnace in the manner and by the means hereinafter described.

To enable others skilled in the art with which it is most nearly connected to make and use my invention, I will proceed to describe its construction and operation.

Figure 4:
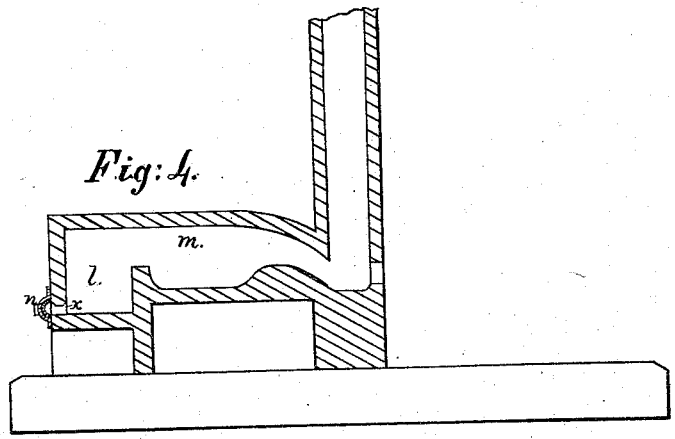

In the accompanying drawings, which form part of my specification, Figure 1 is a top view or plan of my improvement in apparatus for conveying gas to the furnaces used in the manufacture of iron and steel. Fig. 2 is a side elevation of the same. Fig. 3 is an end view of the furnace and a gas-heating device. Fig. 4 is a vertical and longitudinal section of an ordinary puddling-furnace, the fire-chamber of which is arranged for burning gas as a fuel.

In the accompanying drawings, A represents a gas-reservoir, which communicates, by a pipe, B, with a gas-well, *c*, or other gas-supply. The reservoir A is furnished with a stop cock or valve, D, for carrying off the water which accumulates in it by condensation, or by a separation of the water from the gas forced from the well *c*.

When gas is used from wells it will be in a great degree mixed with a watery vapor, and this vapor must be separated from the gas before it is fit to be used in furnace as a fuel for the manufacture of iron or steel.

Gas generated from coal, shale, peat, and other substances should be subjected to a purifying process by passing it through water prior to its entering the reservoir A; and in this purifying or washing process for freeing it from sulphur or other thing which are injurious to iron or steel in the process of manufacturing it or them, a large amount of water, in the form of a fine vapor, is carried off with the gas in its passage to the reservoir A, and it is necessary to separate this watery vapor from the gas before it enters the furnace, otherwise it will not create heat that is sufficient for the making of iron or steel.

By placing a large reservoir between the gas-generating device and the furnace, as herein described, the watery vapor can be readily separated from the gas by the use of the stop-cock or valve D, and drawing off the gas at a higher point of the reservoir A, as at $e$. The gas flows from the wells in pulsations, and is always varying in its action, and a similar condition and action is found in the out-flowing current of gas from gas-generators. By placing a reservoir at a point between the gas-generator and the furnace a steady and uniform flow of gas can be obtained, and also the desired pressure or force of the flow. Sufficient pressure and uniformity of the current of gas to the furnace is necessary to the perfect working of it. I have found by experience that by heating the gas in its passage to the furnace, it will generate more heat, and the working of the furnace will be more uniform. For the purpose of heating the gas the pipe $f$ passes through the furnace $g$, and a small opening is made in the pipe $f$, as indicated at $h$ in Fig. 2. From the opening $h$ the gas flows into the furnace $g$, where it is ignited, and heats the pipe $f$, and thereby heats the gas in its passage through it. I have also found that the gas from well $c$, and that made from coal, will burn better, and create more heat when mixed with atmospheric air. I have for the purpose of supplying the necessary amount of air and mixing it with the gas, connected an air-pump, $k$, with the pipe $f$, as shown in Figs. 1 and 2. The pipe $f$ is furnished with stop-cocks or valves $i$ and $j$, the former being used for regulating the flow through it from the reservoir A, and the latter for regulating the flow of the gas into the fire-chamber $l$ of the puddling-furnace $m$. The only change made in the construction of the furnace $m$ is in its fire-chamber $l$, which is increased in its depth, and is furnished with a close floor and a register, $n$, for regulating the admission of air into the chamber $l$. The gas is admitted to the chamber $l$ through medium of the pipe $f$ connected to the register $n$, from which it flows through openings $x$ into the chamber $l$, where perfect combustion takes place, resulting in the production of an intense heat, which can be increased or diminished by increasing or diminishing the flow of gas into the chamber $l$ by simply turning the stop-cock $j$. I have devices substantially the same as those herein described in operation in the rolling-mill of Rogers & Burchfield, at Leechburg, Armstrong county, Pennsylvania, where all the furnaces in said mill are heated with gas from a well, the puddling and heating furnaces being constructed as herein described, and supplied with gas through a pipe which is only one-half ($\frac{1}{2}$) of an inch in diameter, which pipe is connected to a main supply-pipe, which communicates with a reservoir and passes through a gas-heating device such as herein described.

By the use of gas in connection with the devices and conditions set forth in the foregoing, it is our experience that it saves much labor, is easy on the furnaces, greatly improves the quality of the iron, (making ordinary stock equal to "charcoal-pig,") facilitates the production of good iron, and requires no change in manipulating the stock in the furnaces, nor change in working it when it leaves the furnaces.

I am aware that gas-generating furnaces have been used in the manufacture of iron, and that gas led direct to furnaces of steam-boilers and furnaces of vessels used for boiling salt has also been used. I am also aware that gas and vapors of hydrocarbon oils have been used in the manufacture of iron and steel, but such gas and vapors have always been used in combination with coal coke, or some other article of fuel, and under very different conditions from that described as being of my invention or discovery.

I wish it clearly understood that my invention consists in the utilization of the gas from wells by the means and under the conditions herein before described, whereby it is converted into a suitable fuel for furnaces of the ordinary construction, and in general use for the manufacturing of iron and steel, and as a fuel is also adapted to the present knowledge and skill of the workmen usually employed for working such furnaces. In the absence of gas from wells, I utilize by the same means and for like purposes gas generated from coal, shale, oil, or other suitable matter. Said gas as a fuel when applied and used as herein set forth will be found equal to wood-charcoal, greatly improving the stock used, and uniformly producing good iron without an increase of labor or skill.

What I claim as my invention is—

1. The process of treating gas from oil wells or gas-generators for use as fuel in furnaces used for manufacturing iron or steel, consisting in passing the gas through a reservoir to eliminate watery particles, then subjecting it to heat, and finally conducting it into the fire-chamber with or without the injection of air, substantially as herein described.

2. The combination of the reservoir A and heater $g$, with the furnace $m$, substantially as herein described and for the purpose set forth.

WILLIAM ROGERS.

Witnesses:
JAMES J. JOHNSTON,
HENDERSON E. DAVIS.